(12) United States Patent
Yang

(10) Patent No.: US 11,968,960 B1
(45) Date of Patent: Apr. 30, 2024

(54) DOG TRAINING CLICKER

(71) Applicant: Zerong Yang, Shanxi (CN)

(72) Inventor: Zerong Yang, Shanxi (CN)

(*) Notice: Subject to any disclaimer, the term of this patent is extended or adjusted under 35 U.S.C. 154(b) by 0 days.

(21) Appl. No.: 18/528,436

(22) Filed: Dec. 4, 2023

(30) Foreign Application Priority Data

Nov. 22, 2023 (CN) .......................... 202311566933.2

(51) Int. Cl.
*A01K 15/02* (2006.01)

(52) U.S. Cl.
CPC .................................. *A01K 15/02* (2013.01)

(58) Field of Classification Search
CPC .... A01K 15/02; A01K 15/026; A01K 15/025; A01K 5/0114; G10K 3/00
See application file for complete search history.

(56) References Cited

U.S. PATENT DOCUMENTS

| | | | |
|---|---|---|---|
| 6,073,581 A * | 6/2000 | Wang .................... | A01K 5/0114 119/51.01 |
| 6,484,671 B2 * | 11/2002 | Herrenbruck ............ | A63H 5/00 119/710 |
| 6,722,317 B2 * | 4/2004 | O'Rourke ............ | A01K 5/0114 119/51.01 |
| 9,801,354 B2 * | 10/2017 | Zimmermann ...... | A01K 15/026 |
| 10,085,422 B1 * | 10/2018 | Tsengas ............... | A01K 15/025 |
| 11,399,506 B2 * | 8/2022 | Huang ..................... | A01K 5/00 |
| 11,457,610 B1 | 10/2022 | Johnson et al. | |
| 2003/0136345 A1 * | 7/2003 | O'Rourke ............ | A01K 5/0114 119/51.01 |
| 2005/0183674 A1 * | 8/2005 | Zutis ..................... | A01K 15/025 119/719 |
| 2006/0000416 A1 * | 1/2006 | Zutis ..................... | A01K 5/0114 119/51.01 |
| 2007/0074668 A1 * | 4/2007 | Zutis ..................... | A01K 5/0114 119/51.01 |
| 2013/0233246 A1 * | 9/2013 | Wang .................... | A01K 15/025 119/51.01 |
| 2014/0048017 A1 * | 2/2014 | Mainini ................. | A01K 15/02 119/51.01 |
| 2017/0258041 A1 * | 9/2017 | Dadalto ............... | A01K 5/0114 |
| 2018/0178969 A1 * | 6/2018 | Perlowitz ............... | A01K 15/02 |
| 2019/0274279 A1 | 9/2019 | Hayashi et al. | |
| 2020/0229394 A1 | 7/2020 | Campo | |
| 2021/0176963 A1 * | 6/2021 | Helfers, III ............ | A01K 15/02 |
| 2022/0312735 A1 * | 10/2022 | Claeys .................. | A01K 15/021 |
| 2023/0123107 A1 * | 4/2023 | DiGrado .............. | A01K 15/025 119/707 |
| 2023/0337629 A1 * | 10/2023 | Rowe ................... | A01K 5/0114 |

* cited by examiner

*Primary Examiner* — Trinh T Nguyen

(57) ABSTRACT

The present invention provides a dog training clicker, including a first structural part, a sliding assembly and a second structural part overlaid and arranged in sequence along a first direction; the first structural part includes a first outer shell, the first outer shell is internally provided with a first accommodating space, an elastic sounding plate and a floating button are arranged in the first accommodating space, and the floating button abuts against the elastic sounding plate; the second structural part includes a second outer shell, the first structural part is in sliding connection with the second structural part through the sliding assembly, and the first direction is perpendicular to a second direction.

8 Claims, 4 Drawing Sheets

DOG TRAINING CLICKER

TECHNICAL FIELD

The present application relates to the technical field of pet training, and particularly relates to a dog training clicker.

CROSS REFERENCE TO RELATED APPLICATION

This application claims priority benefit of Chinese design Application No. 202311566933.2, filed on Nov. 22, 2023, and the entire contents of which are incorporated herein by reference.

BACKGROUND

As scientific approaches to dog training come to the public's attention, clicker training becomes a validated and widely used training method. A clicker type dog training aid can make clear and audible prompt sounds. When a trainer is training a pet dog and the pet dog does a correct behavior, the trainer can trigger the clicker type dog training aid to make a sound prompt to accurately and timely mark the behavior, and at the same time, the trainer can give the pet dog a follow-up reward for the accurate behavior. Due to the consistency of the prompt sounds made by the clicker type dog training aid, the prompt sounds can accurately help the pet dog to understand which kind of behavior can earn him a reward. The clear prompt sound made by the clicker type dog training aid is more conducive to increasing the learning speed of the pet dog than a verbal command.

Generally, when using the clicker type dog training aid to train the pet dog, the trainer can offer dog treats as a follow-up reward for the correct behavior. However, clicker type dog training aids are all independent products currently on the market. While using the clicker type dog training aid to train the pet dog, the trainer has to take dog treats from an additional treat bag such as a waist bag or a pocket.

The trainer feels uncomfortable wearing the additional treat bag during the process of dog training, the dog treats may be difficult to take out, and when taking the dog treats, the hands may get dirty easily and are not easy to clean.

SUMMARY

The present invention aims to provide a dog training clicker to solve the problem that treats for rewards are not easy to take out and hands may get dirty easily when using a clicker type dog training aid for dog training.

In order to achieve the above purpose, the present invention provides the following technical solution:

the present invention provides a dog training clicker, comprising a first structural part, a sliding assembly and a second structural part overlaid and arranged in sequence along a first direction; the first structural part comprises a first outer shell, the first outer shell is internally provided with a first accommodating space, an elastic sounding plate is arranged in the first accommodating space, and a floating button is arranged at a position, corresponding to the elastic sounding plate, of the first outer shell and abuts against the elastic sounding plate; the second structural part comprises a second outer shell, and the second outer shell is internally provided with a second accommodating space for accommodating dog treats; the first structural part is in sliding connection with the second structural part through the sliding assembly so that the first structural part can perform a reciprocating sliding motion between a first position and a second position relative to the second structural part along a second direction; wherein the first direction is perpendicular to a second direction; when the first structural part is at the first position, the first outer shell closes the second accommodating space; and when the first structural part is at the second position, the second accommodating space is communicated with the outside.

Further, the first structural part comprises a first closing cover, one side of the first accommodating space toward the second structural part is provided with a first opening, and the first closing cover is arranged at the first opening and closes the first opening; the second structural part further comprises a second closing cover, one side of the second accommodating space toward the first structural part is provided with a second opening, and the second closing cover is arranged at the second opening and partially covers the second opening; the sliding assembly comprises a sliding part and a sliding rail that are in sliding connection with each other, the sliding rail is arranged on one side, close to the first structural part, of the second closing cover and extends along the second direction, and the sliding part is arranged on one side, close to the second structural part, of the first closing cover; wherein a portion, not covered by the second closing cover, of the second accommodating space is communicated with the outside when the first structural part is at the second position.

Further, one side, close to the first accommodating space, of the first closing cover is provided with a connecting structure, the elastic sounding plate extends along the second direction, one end of the elastic sounding plate in an extension direction of the elastic sounding plate is connected to the connecting structure, the other end of the elastic sounding plate in the extension direction of the elastic sounding plate is provided with a touch structure, and the touch structure extends toward the first accommodating space along the first direction and abuts against the floating button.

Further, the first structural part comprises a drying agent and a detachable cover, the first closing cover is provided with a placing groove, the placing groove runs through the first closing cover, the drying agent is disposed in the placing groove, the detachable cover is detachably mounted on one side, close to the second closing cover, of the placing groove to cover the drying agent; a plurality of first through holes are formed at the position, close to the placing groove, of the first closing cover, and the second closing cover is provided with a plurality of second through holes corresponding to the plurality of first through holes so that the placing groove can be communicated with the second accommodating space through the plurality of first through holes and the plurality of second through holes.

Further, the first outer shell is provided with a plurality of third through holes, and each of the third through holes is communicated with the first accommodating space.

Further, one side, far away from the second structural part, of the first outer shell is provided with protrusion structures, and the protrusion structures are used for increasing a surface friction force of the first outer shell.

Further, the sliding assembly comprises an elastic member, the elastic member is arranged at a connection between the sliding rail and the sliding part, the elastic member can produce elastic deformation so that the first structural part can spring back from the second position to the first position through the sliding assembly.

Further, the second closing cover is provided with a first limiting structure and a second limiting structure, the first limiting structure and the second limiting structure are separately located on one side, close to the first structural part, of the second closing cover, and the first limiting structure and the second limiting structure are respectively located at two ends of the sliding rail in an extension direction.

From the analysis, the present invention discloses a dog training clicker. When in use, the floating button can be pressed to make the elastic sounding plate in the first structural part produce elastic deformation, thereby enabling the elastic sounding plate to make a prompt sound. When the pet dog does a correct behavior, the trainer can trigger the dog training clicker to make a sound prompt to accurately and timely mark the behavior, and at the same time, the trainer can slide the first structural part and take out the dog treats stored in the second accommodating space of the second structural part to give the pet dog a follow-up reward for the accurate behavior. The dog training clicker has the functions of clicker type training aids and treat storage so that a trainer can take out dog treats conveniently to reward the pet dog without wearing an additional waist bag or pocket for accommodating the dog treats when training the pet dog.

DESCRIPTION OF THE DRAWINGS

The accompanying drawings, which constitute a part of this application, are used for providing a further understanding of the present invention; and schematic embodiments of the present invention and descriptions thereof are intended to explain the present invention and are not construed to unduly limit the present invention. In the drawings.

Figure 1:
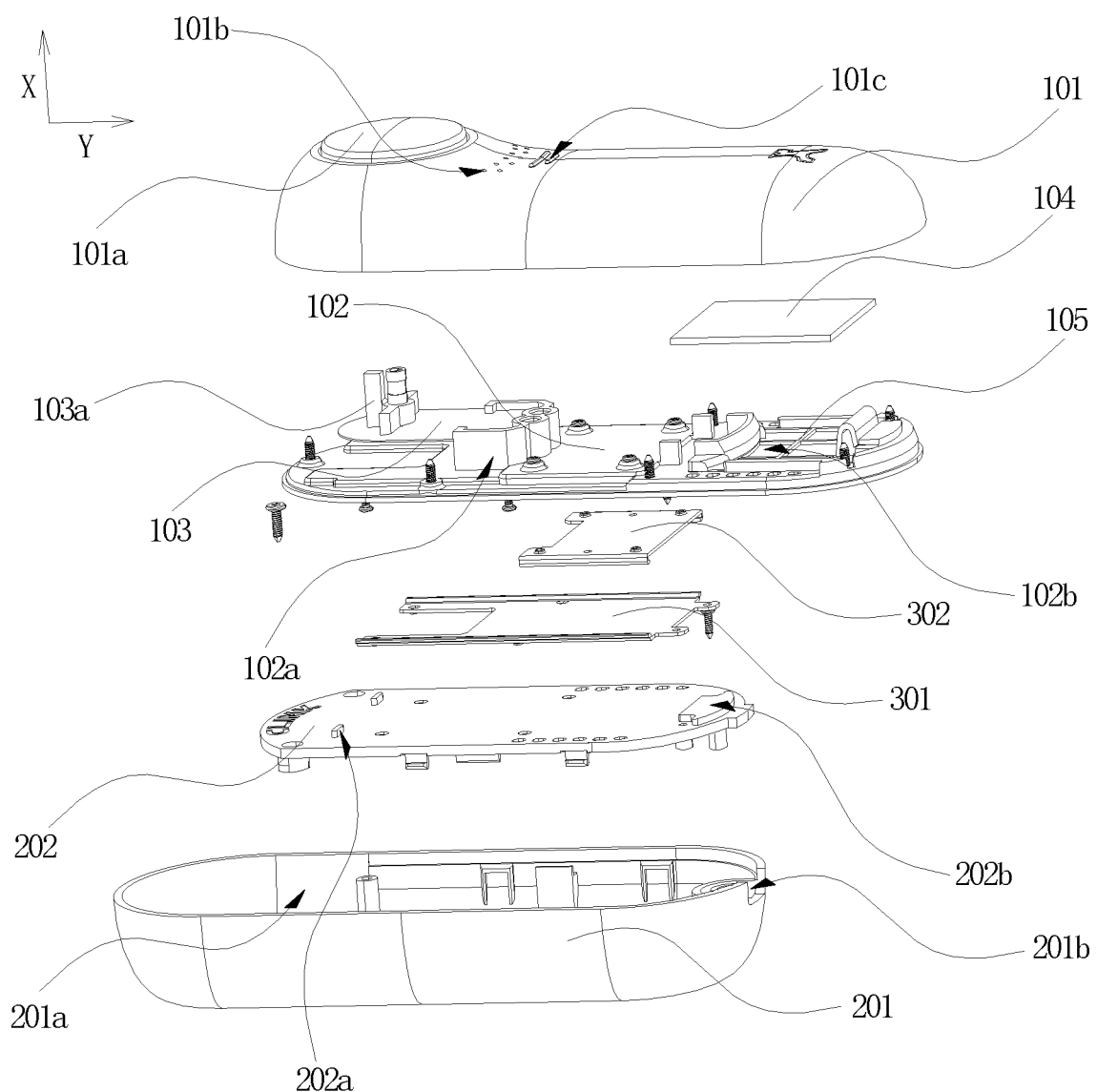
FIG. 1 is a first exploded structural schematic diagram of a dog training clicker according to an embodiment of the present invention.

Descriptions of the drawing reference numbers: 101. first outer shell; 101*a*. floating button; 101*b*. third through hole; 101*c*. protrusion structure; 102. first closing cover; 102*a*. connecting structure; 102*b*. placing groove; 102*c*. first through hole; 103. elastic sounding plate; 103*a*. touch structure; 201. second outer shell; 201*a*. second accommodating space; 201*b*. strap hole; 202. second closing cover; 202*a*. first limiting structure; 202*b*. second limiting structure; 202*c*. second through hole; 301. sliding rail; 302. sliding part; X. first direction; Y. second direction.

DETAILED DESCRIPTION OF EMBODIMENTS

The present invention will be described in detail below with reference to the accompanying drawings and embodiments. Each example is provided by way of explanation of the present invention, not a limitation of the present invention. In fact, those skilled in the art will recognize that modifications and variations can be made in the present invention without departing from the scope or spirit of the present invention. For example, features shown or described as part of one embodiment may be used in another embodiment to produce yet another embodiment. Therefore, it is intended that the present invention includes such modifications and variations as come within the scope of the appended claims and their equivalents.

In the description of the present invention, the orientations or positional relationships indicated by the terms "longitudinal", "transverse", "upper", "lower", "front", "rear", "left", "right", "vertical", "horizontal", "top", "bottom", etc. are based on the orientations or positional relationships shown in the drawings, and are only for the convenience of describing the present invention, rather than requiring that the present invention must be constructed and operated in a specific orientation, so they cannot be interpreted as limitations to the present invention. The terms "linked", "connected" and "arranged" used in the present invention should be understood in a broad sense, for example, it can be a fixed connection or a detachable connection, it can be directly connected or indirectly connected through an intermediate component, and it also can be a wired connection, a radio connection, or a wireless communication signal connection. Those of ordinary skill in the art can understand the specific meanings of the above terms in the present invention according to specific situations.

One or more examples of the present invention are illustrated in the accompanying drawings. The detailed description uses number and letter signs to refer to features in the accompanying drawings. Similar or like reference signs in the drawings and descriptions have been used to refer to similar or like parts of the present invention. As used herein, the terms "first", "second", "third" and the like are used interchangeably to distinguish one member from another and are not intended to denote the location or importance of individual members.

Figure 2:
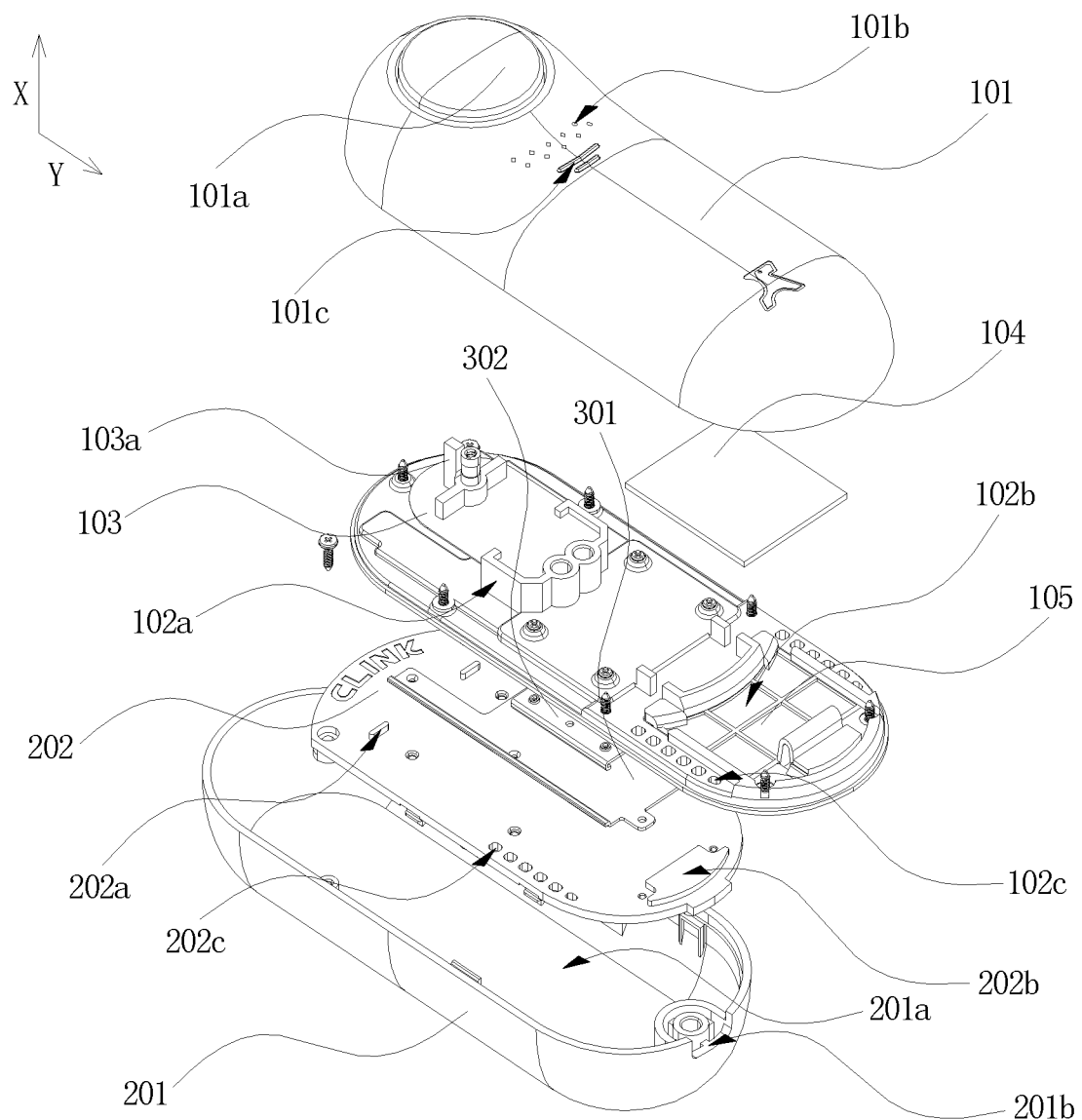
FIG. 2 is a second exploded structural schematic diagram of a dog training clicker according to an embodiment of the present invention.
Figure 3:
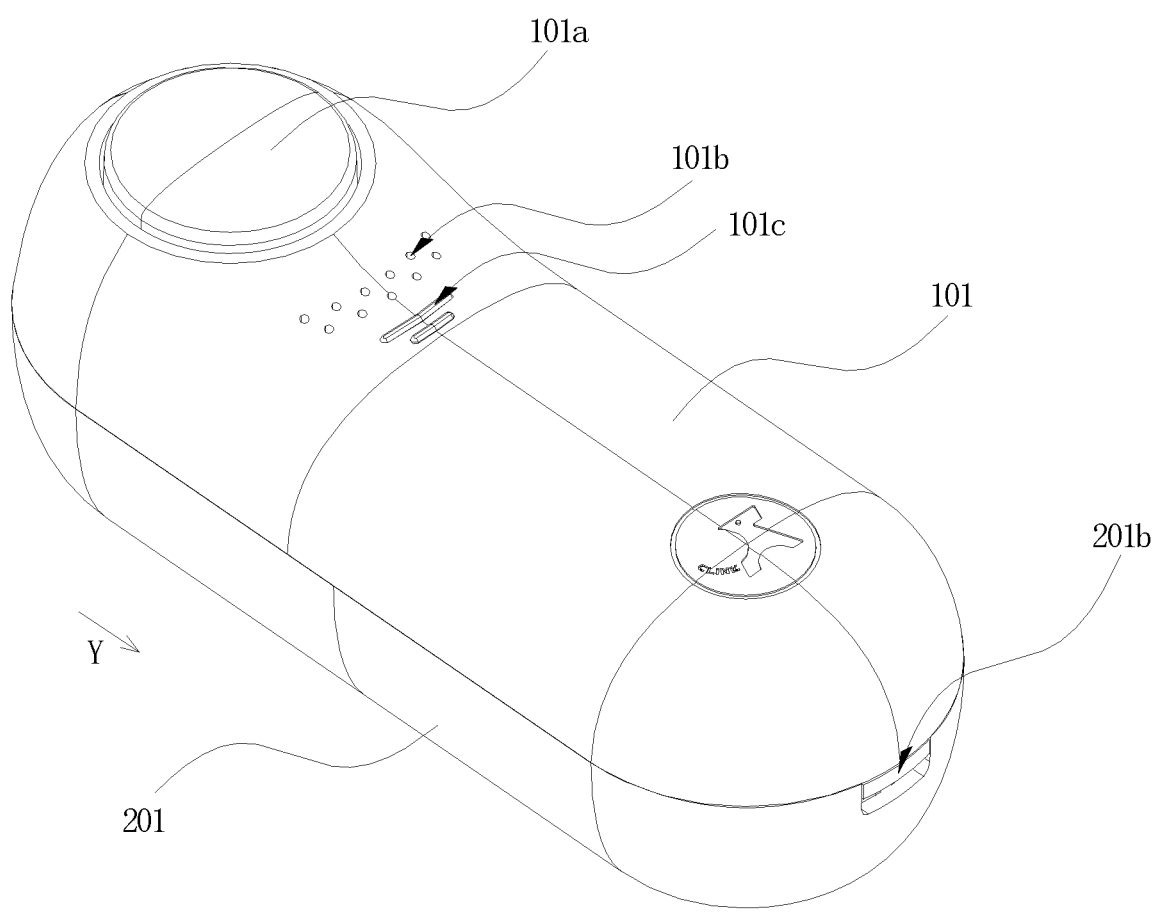
FIG. 3 is a structural schematic diagram of a first structural part of the dog training clicker at the first position according to an embodiment of the present invention.
Figure 4:
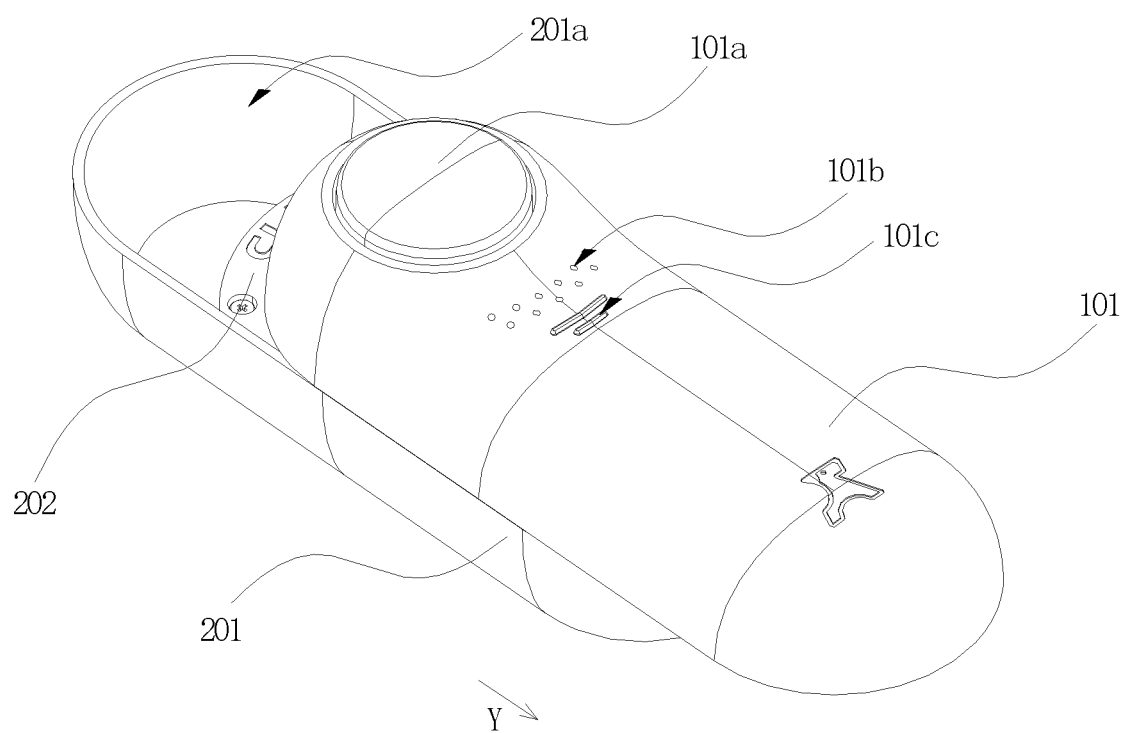
FIG. 4 is a structural schematic diagram of the first structural part of the dog training clicker at the second position according to an embodiment of the present invention.

As shown in FIG. 1 to FIG. 4, the embodiment of the present invention provides a dog training clicker. The dog training clicker includes a first structural part, a sliding assembly and a second structural part overlaid and arranged in sequence along a first direction X; the first structural part includes a first outer shell 101, the first outer shell 101 is internally provided with a first accommodating space, the first accommodating space is internally provided with an elastic sounding plate 103, a floating button 101*a* is arranged at a position, corresponding to the elastic sounding plate 103, of the first outer shell 101, and the floating button 101*a* abuts against the elastic sounding plate 103; the second structural part includes a second outer shell 201, the second outer shell 201 is internally provided with a second accommodating space 201*a*, and the second accommodating space 201*a* is used for accommodating food treats; the first structural part is in sliding connection with the second structural part through the sliding assembly so that the first structural part can perform a reciprocating sliding motion between a first position and a second position relative to the second structural part along a second direction Y; when the first structural part is at the first position, the first outer shell 101 closes the second accommodating space 201*a*; and when the first structural part is at the second position, the second accommodating space 201*a* is communicated with the outside.

As described above, the first structural part, the sliding assembly and the second structural part are overlaid and arranged in sequence along the first direction X and connected through buckle structures and/or threaded fasteners. The first structural part includes the first outer shell 101, the second structural part includes the second outer shell 201, and strip-like structures with curved surfaces can be formed on the first outer shell 101 and the second outer shell 201 by the injection molding process to ensure that the first outer shell 101 and the second outer shell 201 are combined to form a columnar structure with a curved surface so that the trainer can hold the dog training clicker by hand. The first outer shell 101 of the first structural part is provided with a first accommodating space for mounting the elastic sounding plate 103, the floating button 101a used for triggering the elastic sounding plate 103 is arranged at the position, corresponding to the elastic sounding plate 103, of the first outer shell 101, and the second outer shell 201 of the second structural part is provided with a second accommodating space 201a used for accommodating dog treats. When the first structural part is in sliding connection with the second structural part, relative sliding may occur between the first structural part and the second structural part so that the first structural part can perform a reciprocating sliding motion between the first position and the second position along the second direction Y. When at the first position, the first structural part can close the second accommodating space 201a of the second structural part. At the moment, the floating button 101a can be pressed to make the elastic sounding plate 103 in the first structural part produce elastic deformation and make a sound so as to mark a correct behavior done by the pet dog through the prompt sound. When the first structural part is at the second position, the second accommodating space 201a of the second structural part is communicated with the outside so that the trainer can take out dog treats from the second accommodating space 201a to reward the pet dog.

Preferably, one side, close to the second structural part, of the first structural part is provided with a first closing cover 102 for closing the first accommodating space, and one side, close to the first structural part, of the second structural part is provided with a second closing cover 202 for partially closing the second accommodating space 201a. The sliding assembly includes a sliding part 302 and a sliding rail 301 that are matched with each other. The sliding part 302 is mounted on one side, far away from the first accommodating space, of the first closing cover 102, and the sliding rail 301 is mounted on one side, far away from the second accommodating space 201a, of the second closing cover 202. The first structural part is in sliding connection with the sliding rail 301 mounted on the second structural part through the sliding part 302 so that relative sliding can occur between the first structural part and the second structural part through the sliding rail 301 and the sliding part 302. When the first structural part slides to the second position, a portion, not covered by the second closing cover 202, of the second accommodating space 201a of the second structural part can be communicated with the outside so as to ensure that the trainer can take out the dog treats stored in the second accommodating space 201a.

Preferably, a connecting structure 102a is formed on the surface of one side, close to the first accommodating space, of the first closing cover 102 by the injection molding process, the elastic sounding plate 103 extends along the second direction Y, and one end of the elastic sounding plate 103 in an extension direction is connected to the connecting structure 102a so that a preset distance can be formed between the elastic sounding plate 103 and the first closing cover 102 along the first direction X to ensure that the elastic sounding plate 103 has a sufficient deformation space. A columnar touch structure 103a extending toward the first accommodating space along the first direction X is mounted at the other end of the elastic sounding plate 103 through a threaded fastener, and the end, far away from the elastic sounding plate 103, of the touch structure in the extension direction abuts against the floating button 101a to ensure that the floating button 101a can be pressed to make the elastic sounding plate 103 produce elastic deformation, thereby making a sound through the elastic deformation.

Preferably, a placing groove 102b can be formed on the surface of one side, close to the first accommodating space, of the first closing cover 102, and the placing groove 102b runs through the first closing cover 102 so that a drying agent can be placed into the placing groove 102b from one side, close to the second structural part, of the first closing cover 102; and after the drying agent is placed into the placing groove 102b, the placing groove 102b can be closed by a detachable cover from one side, close to the second structural part, of the first closing cover 102. Two sides of the placing groove 102b are respectively provided with a plurality of first through holes 102c running through the first closing cover 102. The second closing cover 202 is provided with a plurality of second through holes 202c corresponding to the plurality of first through holes 102c. When the first structural part is at the first position, the second accommodating space 201a inside the second structural part can be communicated with the placing groove 102b accommodating the drying agent through the plurality of second through holes 202c and the plurality of first through holes 102c in sequence so that the drying agent in the placing groove 102b can achieve a drying effect on the dog treats stored in the second accommodating space 201a. After the failure of the drying agent, a new drying agent can be replaced by sliding the first structural part to the second position through the sliding assembly and removing the detachable cover.

Preferably, the first outer shell 101 is provided with a plurality of third through holes 101b running through the first outer shell 101 to be communicated with the first accommodating space so that the sound made by the elastic deformation generated from the sounding plate touched by the floating button 101a through the touch structure 103a can be propagated through the plurality of third through holes 101b, the sound made by the dog training clicker can be clearer, and the pet dog can clearly distinguish the sound made by the dog training clicker.

Preferably, one side, far away from the second structural part, of the first outer shell 101 is provided with a plurality of bar-type protrusion structures 101c. The protrusion structures 101c can be integrally injection-molded with the first outer shell 101 through an injection mold by the injection molding process. The protrusion structures 101c can increase a surface friction force of the first outer shell 101 so that the trainer can push the protrusion structures 101c with a finger to produce relative sliding between the first structural part and the second structural part when wanting to take out the dog treats in the second accommodating space 201a.

Preferably, one side of the second outer shell 201 is provided with a strap hole 201b. When the dog training clicker is used, a strap can be threaded in the strap hole 201b so that the trainer can hang the dog training clicker to the wrist or the palm through the strap, thereby being capable of carrying and using the dog training clicker conveniently.

Preferably, an elastic plate or a spring can be arranged at a sliding junction between the sliding rail 301 and the sliding part 302. When the first structural part and the second structural part slide relatively through the sliding assembly under an external force, the elastic plate or the spring can produce elastic deformation to generate elastic damping between the sliding rail 301 and the sliding part 302. Only when the external force applied to the first structural part overcomes the elastic damping, the relative sliding may occur between the first structural part and the second structural part. The elastic damping provided by the elastic plate or the spring can have a limiting effect of preventing the relative sliding produced between the first structural part and the second structural part under no external force, thereby preventing the dog treats in the second accommodating space 201*a* from dropping accidentally.

Preferably, a first limiting structure 202*a* and a second limiting structure 202*b* are arranged at a mounting position, corresponding to the sliding rail 301, of the second closing cover 202. The first limiting structure 202*a* and the second limiting structure 202*b* are of raised bar-type and/or blocky structures. The first limiting structure 202*a* and the second limiting structure 202*b* are located at two ends of the sliding rail 301 in the extension direction respectively. The first limiting structure 202*a* and the second limiting structure 202*b* can be integrally injection-molded with the second closing cover through an injection mold by the injection molding process so that it is ensured that a sliding distance of the sliding part 302 on the sliding rail 301 can be limited through the first limiting structure 202*a* and the second limiting structure 202*b* when the sliding part 302 slides on the sliding rail 301, thereby preventing the separation of the first limiting structure and the second structural part when relative sliding occurs between the first structural part and the second structural part through the sliding assembly.

From the above description, it can be seen that the above embodiments of the present invention achieve the following technical effects:

Compared with the prior art, when the dog training clicker according to the embodiments of the present invention is in use, the floating button 101*a* can be pressed to make the elastic sounding plate 103 in the first structural part produce elastic deformation, thereby enabling the elastic sounding plate to make a prompt sound. When the pet dog does a correct behavior, the trainer can accurately and timely mark the behavior through the prompt sound made by the dog training clicker, and at the same time, the trainer can slide the first structural part to take out the dog treats stored in the second accommodating space 201*a* of the second structural part to reward the pet dog. The dog training clicker has the functions of clicker type training aids and treat storage so that a trainer can take out dog treats conveniently to reward the pet dog without wearing an additional waist bag or pocket for accommodating the dog treats when training the pet dog.

The foregoing is merely a preferred embodiment of the present invention and is not intended to limit the present invention which may be subject to various modifications and variations to those skilled in the art. Any modification, equivalent replacement, improvement, etc. made within the spirit and principles of the present invention should be included in the scope of protection of the present invention.

What is claimed is:

1. A dog training clicker, comprising a first structural part, a sliding assembly and a second structural part overlaid and arranged in sequence along a first direction;
    the first structural part comprising a first outer shell, wherein the first outer shell is internally provided with a first accommodating space, the first accommodating space is internally provided with an elastic sounding plate, a floating button is arranged at a position, corresponding to the elastic sounding plate, of the first outer shell, and the floating button abuts against the elastic sounding plate;
    the second structural part comprising a second outer shell, wherein the second outer shell is internally provided with a second accommodating space for accommodating food treats;
    the first structural part being in sliding connection with the second structural part through a sliding assembly so that the first structural part can perform a reciprocating sliding motion between a first position and a second position relative to the second structural part along a second direction;
    wherein the first direction is perpendicular to the second direction;
    the first outer shell closing the second accommodating space when the first structural part is at the first position;
    the second accommodating space being communicated with the outside when the first structural part is at the second position.

2. The dog training clicker according to claim 1,
    wherein the first structural part further comprises a first closing cover, one side of the first accommodating space toward the second structural part is provided with a first opening, and the first closing cover is arranged at the first opening and closes the first opening;
    the second structural part further comprises a second closing cover, one side of the second accommodating space toward the first structural part is provided with a second opening, and the second closing cover is arranged at the second opening and partially covers the second opening;
    the sliding assembly comprises a sliding part and a sliding rail that are in sliding connection with each other, the sliding rail is arranged on one side, close to the first structural part, of the second closing cover and extends along the second direction, and the sliding part is arranged on one side, close to the second structural part, of the first closing cover;
    wherein a portion, not covered by the second closing cover, of the second accommodating space is communicated with the outside when the first structural part is at the second position.

3. The dog training clicker according to claim 2,
    wherein one side, close to the first accommodating space, of the first closing cover is provided with a connecting structure, the elastic sounding plate extends along the second direction, one end of the elastic sounding plate in an extension direction of the elastic sounding plate is connected to the connecting structure, the other end of the elastic sounding plate in the extension direction of the elastic sounding plate is provided with a touch structure, and the touch structure extends toward the first accommodating space along the first direction and abuts against the floating button.

4. The dog training clicker according to claim 3,
    wherein the first structural part further comprises a drying agent and a detachable cover, the first closing cover is provided with a placing groove, the placing groove runs through the first closing cover, the drying agent is placed in the placing groove, the detachable cover is detachably mounted on one side, close to the second closing cover, of the placing groove to cover the drying agent;
    a plurality of first through holes are formed at the position, close to the placing groove, of the first closing cover, and the second closing cover is provided with a plurality of second through holes corresponding to the plurality of first through holes so that the placing groove can be communicated with the second accommodating space through the plurality of first through holes and the plurality of second through holes.

5. The dog training clicker according to claim 3,
wherein the first outer shell is provided with a plurality of third through holes, each of the third through holes is communicated with the first accommodating space, and the plurality of third through holes are used for transferring vibrating airflow generated from elastic deformation of the elastic sounding plate in the first accommodating space to the outside of the first accommodating space.

6. The dog training clicker according to claim 3,
wherein one side, far away from the second structural part, of the first outer shell is provided with protrusion structures, and the protrusion structures are used for increasing a surface friction force of the first outer shell.

7. The dog training clicker according to claim 2,
wherein the sliding assembly further comprises an elastic member, the elastic member is arranged at a connection between the sliding rail and the sliding part, the elastic member can produce elastic deformation so that no relative sliding occurs between the first structural part and the second structural part under no external force.

8. The dog training clicker according to claim 7,
wherein the second closing cover is provided with a first limiting structure and a second limiting structure, the first limiting structure and the second limiting structure are separately located on one side, close to the first structural part, of the second closing cover, and the first limiting structure and the second limiting structure are respectively located at two ends of the sliding rail in an extension direction.

\* \* \* \* \*